United States Patent
Bekooij

(10) Patent No.: US 12,442,895 B2
(45) Date of Patent: Oct. 14, 2025

(54) DETERMINING RELIABILITY OF A DIRECTION OF ARRIVAL (DOA) OF A SIGNAL RECEIVED BY A RADAR SYSTEM FROM A SOURCE AND APPARATUS FOR DETERMINING RELIABILITY

(71) Applicant: NXP B.V., Eindhoven (NL)

(72) Inventor: Marco Jan Gerrit Bekooij, Empel (NL)

(73) Assignee: NXP B.V., Eindhoven (NL)

( * ) Notice: Subject to any disclaimer, the term of this patent is extended or adjusted under 35 U.S.C. 154(b) by 511 days.

(21) Appl. No.: 17/449,533

(22) Filed: Sep. 30, 2021

(65) Prior Publication Data
US 2023/0101091 A1    Mar. 30, 2023

(51) Int. Cl.
| | |
|---|---|
| *G01S 7/41* | (2006.01) |
| *G01S 7/292* | (2006.01) |
| *G01S 13/02* | (2006.01) |
| *G01S 13/36* | (2006.01) |

(52) U.S. Cl.
CPC ............ *G01S 7/417* (2013.01); *G01S 7/2927* (2013.01); *G01S 7/411* (2013.01); *G01S 7/414* (2013.01); *G01S 13/36* (2013.01); *G01S 2013/0245* (2013.01)

(58) Field of Classification Search
CPC combination set(s) only.
See application file for complete search history.

(56) References Cited

U.S. PATENT DOCUMENTS

| | | | |
|---|---|---|---|
| 10,627,508 B2 | 4/2020 | Kamo et al. | |
| 2012/0268325 A1* | 10/2012 | Hansen | G01S 13/42 342/373 |

(Continued)

FOREIGN PATENT DOCUMENTS

| | | |
|---|---|---|
| CN | 111580042 A | 8/2020 |
| CN | 112130111 A | 12/2020 |
| JP | 2016138829 A * | 8/2016 |

OTHER PUBLICATIONS

Engels et al., Advances in Automotive Radar: A framework on computationally efficient high-resolution frequency estimation, Mar. 3, 2017, IEEE Signal Processing Magazine, vol. 34 No. 2, pp. 36-46. (Year: 2017).*

(Continued)

*Primary Examiner* — Vladimir Magloire
*Assistant Examiner* — Eric K Hodac

(57) ABSTRACT

A snapshot comprises a plurality of signals is received where each of the plurality of signals reflected from a respective source and received by an antenna array. A first DoA estimator determines, based on the received snapshot, a plurality of DoAs, the plurality of DoAs comprising a respective DoA for each of the plurality of signals. A reliability of the plurality of DoAs is measured. In response to the reliability of the plurality of the DoAs exceeding a threshold, at least one of the plurality of the DoAs determined by the first DoA estimator is output. In response to the reliability of the plurality of the DoAs not exceeding the threshold, a second DoA estimator determines based on the received snapshot a second plurality of DoAs comprising a respective DoA of each of the plurality of signals and outputs at least one of the second plurality of DoAs.

19 Claims, 6 Drawing Sheets

(56) References Cited

U.S. PATENT DOCUMENTS

| | | | |
|---|---|---|---|
| 2013/0275873 A1* | 10/2013 | Shaw | G01B 21/00 715/716 |
| 2016/0223651 A1* | 8/2016 | Kamo | G01S 13/426 |
| 2020/0247433 A1 | 8/2020 | Scharfenberger et al. | |

OTHER PUBLICATIONS

Gardill et al., A Multi-Layer Perceptron Applied To Number of Target Indication for Direction-Of-Arrival Estimation in Automotive Radar Sensors, 2018 IEEE 28th International Workshop on Machine Learning for Signal Processing (MLSP), pp. 1-6 (Year: 2018).*

Bialer et al., "Performance Advantages of Deep Neural Networks for Angle of Arrival Estimation," ICASSP 2019-2019 IEEE International Conference on Acoustics, Speech and Signal Processing (ICASSP), 5 pages.

Hacker et al., "Single snapshot DOA estimation," Adv. Radio Sci., 8, 2010, pp. 251-256.

He et al., "Deep Residual Learning for Image Recognition," 2016 IEEE Conference on Computer Vision and Pattern Recognition, 9 pages.

Liu, Wanli, "Super resolution doa estimation based on deep neural network," downloaded from https://www.nature.com/articles/s41598-020-76608-y.pdf on Sep. 28, 2021, 9 pages.

Zhang et al., "Testing and verification of neural-network-based safety-critical control software: A systematic literature review," Information and Software Technology vol. 123, Jul. 2020, 21 pages.

Heidenreich, Philipp, "Antenna array processing: autocalibration and fast high-resolution methods for automotive radar," Technische Universitat Darmstadt, 2012, 145 pages.

Gardill et al., "A Multi-Layer Perceptron Applied To Number of Target Indication for Direction-Of-Arrival Estimation in Automotive Radar Sensors;" 2018 IEEE 28th International Workshop On Machine Learning for Signal Processing (MLSP), IEEE, Sep. 17, 2018 (Sep. 17, 2018), pp. 1-6.

Engels et al., "Advances in Automotive Radar: A framework on computationally efficient high-resolution frequency estimation;" IEEE Signal Processing Magazine, vol. 34, No. 2, Mar. 1, 2017 (Mar. 1, 2017), pp. 36-46.

* cited by examiner

DETERMINING RELIABILITY OF A DIRECTION OF ARRIVAL (DOA) OF A SIGNAL RECEIVED BY A RADAR SYSTEM FROM A SOURCE AND APPARATUS FOR DETERMINING RELIABILITY

FIELD OF USE

This disclosure generally relates to an apparatus such as a radar system, and more particularly to determining reliability of a direction of arrival (DoA) of a signal reflected by a source and received by the radar system.

BACKGROUND

A typical radar system used in autonomous driving vehicles has a transmitter which transmits a signal which is then reflected by one or more targets and a receiver which receives the respective reflected signals. Each target which reflects the signal is considered a source of a reflected signal and the receiver has several antenna of an antenna array to receive the respective reflected signal from each of the one or more sources. The radar system further defines a snapshot for a range-doppler cell (e.g., smallest range increment detectable by the radar system) as signals above a noise floor reflected from one or more sources having a same range to the radar system and velocity (doppler). The radar system uses the snapshot to estimate a Direction-of-Arrival (DoA) of a signal reflected from a source based on any of several techniques, e.g. Fast-Fourier Transform, multiple signal classification (MUSIC), and Deterministic Maximum Likelihood (DML) algorithm. The DML algorithm outperforms in DoA estimation accuracy and resolution compared with the other techniques especially when only a single snapshot is only available for the DoA estimation.

The computational complexity of the DML algorithm to determine DoAs of signals typically depends on the number of sources of the snapshot, and grows exponentially with the number of sources. The complexity becomes prohibitively large for more than two sources in many practical implementations. Recently, deep neural networks (DNN) have been demonstrated to estimate DoAs of signals. A DNN models a relationship between a received signal from a source and a DoA of the received signal. Unlike the DML algorithm, computational requirements of DNN are independent of the number of sources, but the DoA of the signal estimated by the DNN might be less accurate than the DoA of the signal estimated by the DML, algorithm because the DoA of the signal is a continuous value, i.e. in and the DNN implements a function that is not smooth (i.e., small deviations of the input values not necessarily lead to small deviations at the output values). In this manner, DNNs are perceived as unreliable and are typically not used in safety critical systems such as autonomous driving vehicles.

Figure 1:
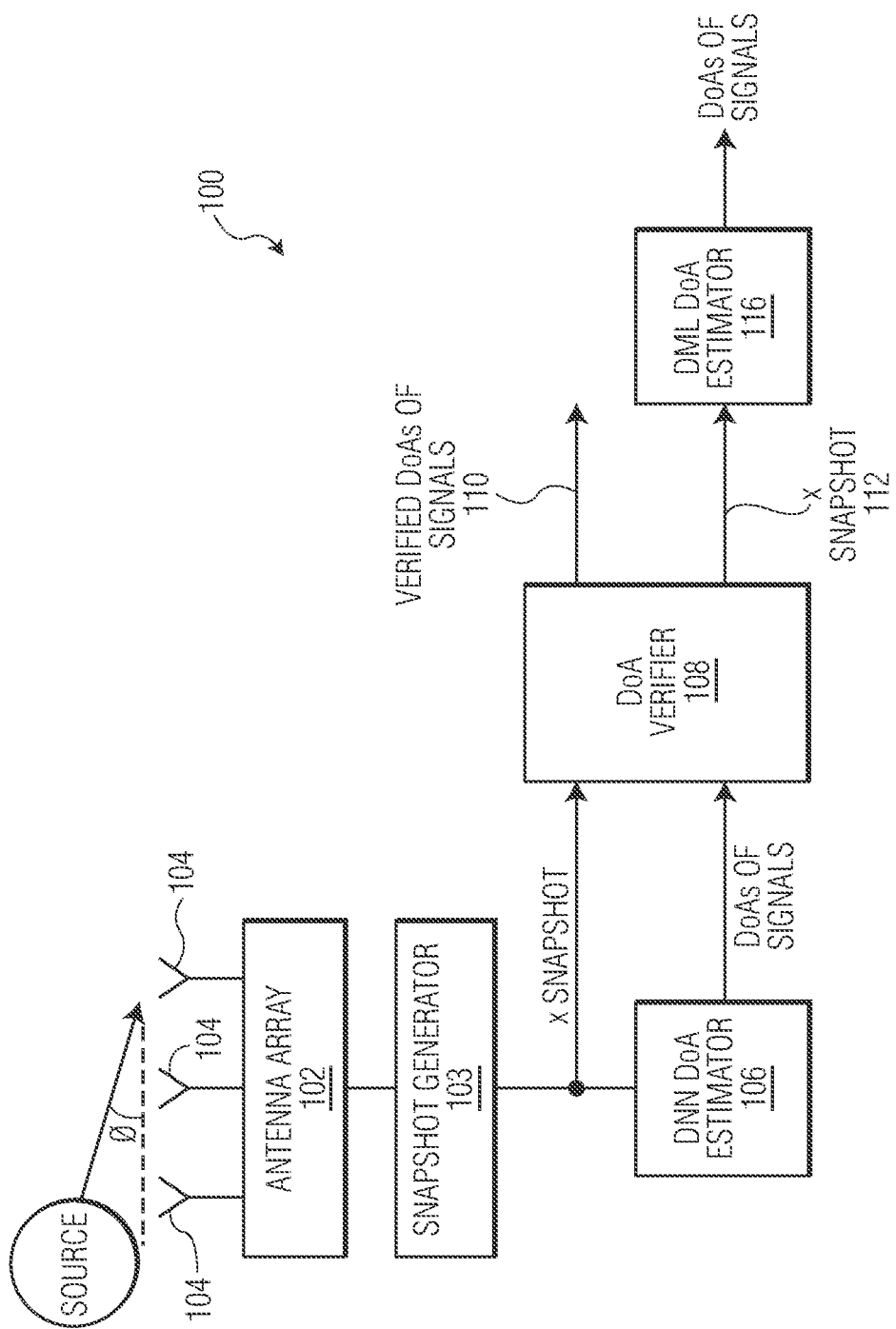
FIG. 1 is an example block diagram of an example DoA verification system of a radar system in accordance with one or more embodiments.

The drawings are for the purpose of illustrating example embodiments, but it is understood that the embodiments are not limited to the arrangements and instrumentality shown in the drawings.

DETAILED DESCRIPTION

Embodiments disclosed herein are directed to overcoming or reducing one or more limitations of a neural network which is used to determine direction of arrivals (DoAs) of signals reflected by sources and received by a radar system. The radar system defines a snapshot which comprises one or more signals reflected from one or more sources with a same range and velocity (doppler) and received by an antenna array of the radar system. The radar system also estimates the snapshot based on DoAs of signals determined by the neural network and the snapshot. In one or more embodiments, the snapshot estimate is compared with the snapshot. In the event that a residual noise error between the snapshot estimate and the snapshot is less than a noise estimate plus an error margin (i.e., residual noise error is similar to the noise estimate), it may be concluded that the DoAs of signals determined by the neural network correspond to all the sources of the snapshot. In the event a residual noise error between the snapshot estimate and the snapshot is not less than a noise estimate plus an error margin, it may be concluded that the DoAs of signals determined by the neural network do not correspond to all the sources of the snapshot and in that case, a deterministic maximum likelihood (DML) algorithm determines the DoAs of signals instead of the neural network. In one or more other embodiments, the radar system searches based on the estimated snapshot for a DoA of a signal reflected from an additional source not represented by the DoAs of signals determined by the neural network. The additional source is searched for within a range of candidate angles. In the event the DoA of the signal corresponding to the additional source is found based on the search, the DoAs of signals determined by the neural network do not correspond to all the sources in the snapshot. The DoAs of signals are estimated using a DML algorithm instead of the neural network. In the event the DoA of the signal corresponding to the additional source is not found based on the search, it may be concluded that the DoAs of signals determined by the neural network correspond to all the sources in the snapshot. In yet other embodiments, two or more DoAs of signals could correspond to a same source. The radar system determines, by a ratio of estimated snapshots determined from the two or more DoAs of signals, whether two or more of the DoAs of signals correspond to a same source. By the radar system determining the DoAs of signals followed by determination of reliability of the DoAs of signals as described herein, the determination of the DoAs of signals may have a low computational complexity while providing accurate results.

FIG. 1 is an example block diagram of an example DoA verification system 100 of a radar system in an accordance with one or more embodiments. The DoA verification system 100 (also referred to as "verification system") may include an antenna array 102, a neural network DoA estimator such as a deep neural network (DNN) DoA estimator 106, a DoA verifier 108, and a deterministic machine learning (DML) DoA estimator 116 each implemented using circuitry such as analog circuitry, mixed signal circuitry, memory circuitry, logic circuitry, processing circuitry arranged to execute code stored in a memory and when executed by the processing circuitry perform the disclosed functions, or combinations thereof. In an example, the radar system may be implemented in an autonomous driving vehicle to determine presence of objects in an environment to facilitate autonomous driving. The objects may be other vehicles or pedestrians in an example.

The radar system may have a transmitter that transmits a signal such as a microwave signal which is then reflected back to the radar system by one or more targets. The antenna array 102 may include one or more antennas 104 for receiving a respective signal which is reflected back by a target. The target which reflects a signal may be referred to as a source of the signal. In an example, an antenna 104 of the antenna array 102 may be uniformly spaced at ½ a wavelength of the signal or non-uniformly spaced along the antenna array 102. The spacing between the antenna 104 of the antenna array 102 might not be uniform, to increase an antenna aperture and also to improve DoA estimation accuracy and resolution. The signals may be received on several antennas 104 of the antenna array 102. The radar system further defines a snapshot for a range-doppler cell (e.g., smallest range increment detectable by the radar system) as signals reflected from one or more sources having a same range to the radar system and velocity (doppler) determined by a snapshot generator 103 which in an example performs a Fast Fourier Transform (FFT) of the signals received by the antenna array 102 to determine the snapshot. The signals of the snapshot may be received at a particular point in time on each antenna 104 and be above a noise floor of the cell.

A machine learning model is a mathematical or statistical model which is trained with a set of data to recognize certain types of features in the sett of data. The model is then used to reason over data which the model has not processed before and predict types of features based on this data. A neural network and specifically a Deep Neural Network (DNN) implements a machine learning model as multiple layers between an input layer of the DNN and an output layer of the DNN. Each layer progressively extracts higher-level features from data input to the input layer of the DNN which are then output by the output layer of the DNN. In the DNN, an output of one layer may be input into another layer and each layer may have a set of non-linear functions. The DNN DoA estimator 106 may be arranged to receive as an input the snapshot and the one or more layers may extract features in the form of DoAs of signals reflected from sources associated with the snapshot. In an example, each signal has a respective DoA and a radar system verifies the DoA of the signal. Further, a DoA of a signal may be associated with a confidence value that indicates a likelihood that the DoA of the signal is correct. The DNN DoA estimator 106 may identify the DoAs of signals which have a minimum confidence value and output only those DoAs of signals which exceed a threshold value.

A computational complexity of the DNN DoA estimator 106 is independent of the number of sources. However, the DNN DoA estimator 106 has an inherent problem that it is impossible to guarantee correct estimation of the DoAs of signals because the DoAs of signals are continuous due to non-linear functions used in the DNN DoA estimator 106 to determine the DoAs of signals. The DNN DoA estimator 106 might not estimate DoAs of signals accurately even when noise does not distort the snapshot.

Embodiments described herein are directed to a DoA verifier 108 which verifies the DoAs of signals output by the DNN DoA estimator 106 using a DML based computation as described herein. The DoA verifier 108 may receive the snapshot and one or more DoAs of signals output by the DNN DoA estimator 106 and output whether the DoAs of signals are reliable. In the event the DoAs of signals are reliable, the DoA verifier 108 may output verified DoAs of signals at an output 110. In the event the DoAs of signals are not reliable, the DoA verifier may outputs the snapshot x at output 112. The output 112 may be coupled to the DML DoA estimator 116 which estimates the DoAs of signals for the snapshot x. The DML DoA estimator 116 may be a different type of DoA estimator compared with the DNN DoA estimator 106, with higher complexity. The DML DoA estimator 116 may estimate DoAs of signals of the snapshot by searching in a search space of angles for the DoAs of signals and output the DoAs of signals. The DML DoA estimator 116 may have a complexity greater than that of the DNN DoA estimator 106. In examples, the DML DoA estimator 116 may determine the DoAs of signals only when the DoAs of signals output by the DNN 116 are not verified such that the DNN 116 is more often used to determine the DoAs of signals resulting in an overall lower computational complexity for determining DoAs of signals.

Figure 2:
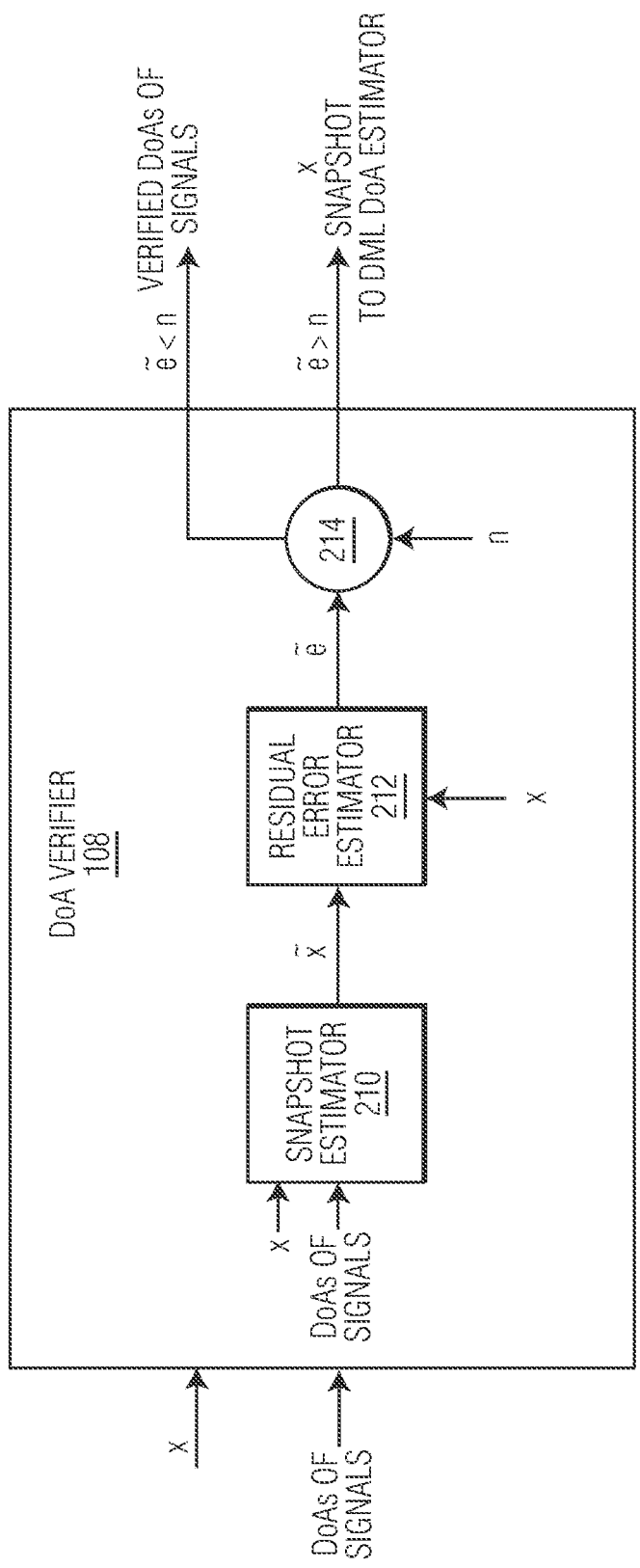
FIG. 2 is an example block diagram of an example DoA verifier of the example DoA verification system in accordance with one or more embodiments.

FIG. 2 is an example block diagram of an example DoA verifier 108 of the example DoA verification system in accordance with one or more embodiments. In an example, the DoA verifier 208 may include a snapshot estimator 210, a residual error estimator 212, and a comparator 214 each implemented using circuitry such as analog circuitry, mix signal circuitry, memory circuitry, logic circuitry, processing circuitry arranged to execute code stored in a memory and when executed by the processing circuitry perform the disclosed functions, or combinations thereof.

The snapshot estimator 210 may estimate the snapshot and the residual error estimator 212 may estimate an error between the snapshot estimate and the snapshot x to form a residual error estimate. In an example, the snapshot estimate may be an estimate of the snapshot not accounting for any background noise, clutter or interference and based on the DoAs of signals and the snapshot. The DoA verifier 108 may compare, using the comparator 214, the residual error estimate with a noise estimate and in some examples the noise estimate plus an error margin which is a small positive value. In the event the residual error estimate is less than the noise estimate plus an error margin, the DoA verifier 108 may output the verified DoAs of signals from the DNN DoA estimator 106 because they are verified as being correct. In the event the residual error estimate is not less than the noise estimate plus the error margin, the DoA verifier 108 may output the snapshot x. The output of the snapshot x may cause the DML DoA estimator 116 to determine the DoAs of signals because the DoAs of signals from the DNN DoA estimator 106 are not verified as being correct.

The snapshot estimator 210 may determine the snapshot estimate based on an assumption that an antenna array 102 is arranged in an arbitrary geometry immersed in a field of N point sources at unknown locations. The arbitrary geometry may include antennas 104 of the antenna array 102 arranged in azimuth-only or in azimuth and elevation. The snapshot x which is received from the antenna array 102 may be represented as:

$$x = As \quad (1)$$

where s is a vector of respective signal amplitudes at the sources and A is a beamforming matrix A (more precisely $A(\phi)$ with a $\phi$ vector being the DoAs of signals reflected from the sources represented as a vector $\phi = \{\phi 1, \ldots, \phi N\}$). The matrix $A(\phi)$ has the following structure: $A(\phi) = [a(\phi 1) \ldots a(\phi N)]$ where N is a number of sources and $a(\phi m)$ describes a mapping between a DoA of a signal $\phi n$ and an array response of the signal with the DoA and is based on a complex number. An exact value of $a(\phi n)$ may depend on a geometry of the antenna array 102.

In the event A was invertible, a power of the signals reflected from sources may be represented as:

$$s = A^{-1}x \quad (2)$$

However A might not be invertible because it is generally not a square matrix; for instance it is an [8×2] matrix for the case of 2 sources and 8 antennas. A pseudo inverse is represented as $A^+$. With the pseudo inverse, an estimate of $\tilde{s}$ of the sources can be computed. This estimate is optimal in the least square sense, i.e. $\forall s, |As-x|^2 \geq |A\tilde{s}-x|^2$. The snapshot $\tilde{x}$ is then represented as:

$$\tilde{x} = A\tilde{s} = AA^+x \quad (3)$$

The snapshot estimator 210 may receive the DoAs of signals and snapshot and output the snapshot estimate based on the equations above. The snapshot estimate may then be provided to a residual noise error estimator 112. An estimate of residual noise error $\tilde{e}$ (e.g., residual error estimate) then becomes:

$$\tilde{e} = x - \tilde{x} \quad (4)$$

which is output by the residual noise estimator 212. The residual noise error may be a measure of reliability of the DoAs of signals received by the DoA verifier 108. The comparator 214 may then compare a power of the estimate of residual error $\tilde{e}$ with a power of a noise estimate n. The noise estimate n may be a threshold to detect target returns against background noise, clutter and interference determined by a constant false alarm rate (CFAR) detector of the radar system. In a most simple CFAR detection, the threshold is calculated by estimating a level of a noise floor around a cell under test (CUT). In the event that the power of the residual noise error $\tilde{e}$ is higher than power of the noise estimate plus an error margin, the estimated angle vector $\phi$ is likely incorrect. The DoA verifier 108 may then provide an indication to the DML DoA estimator 116 to determine the DoAs of signals based on the snapshot using a DML algorithm. The DML algorithm involves searching a search space of candidate angles of DoAs of signals for a power of a snapshot estimate which is maximized. The power may be characterized as a DML value computed by:

$$DML = \tilde{x}^H \cdot \tilde{x} \quad (5)$$

where H is a conjugate transpose of the snapshot estimate. The search space may be a multi-dimensional grid where each dimension may define a search space of candidate angles. In an example, the size of the search space may be equal to a plurality of candidate DoAs searched to identify a DoA of a signal raised to a power equal to a number of DoAs of signals searched. For example, 256 candidate DoAs are searched to identify a DoA of a signal and 256×256 candidate DoAs are searched in the event DoAs for two signals are identified. The DML DoA estimator 116 may output the one or more DoAs of signals and have a higher complexity than the DNN DoA estimator 106. In the event the power of the residual error $\tilde{n}$ is not higher than the power of the noise estimate plus an error margin, the estimated angle vector $\phi$ from the DNN DoA estimator 106 is likely correct. The DoA verifier 108 may output the DoAs of signals from the DNN DoA estimator 106 as verified DoAs of signals. Computation of $\tilde{e}$ is relatively cheap in terms of complexity because the pseudo inverse matrix $A^+$ may be computed once for each of the DoAs of signals output by the DNN DoA estimator 106, instead of searching every possible candidate angle vector $\phi$ that is considered in the DML algorithm.

Figure 3:
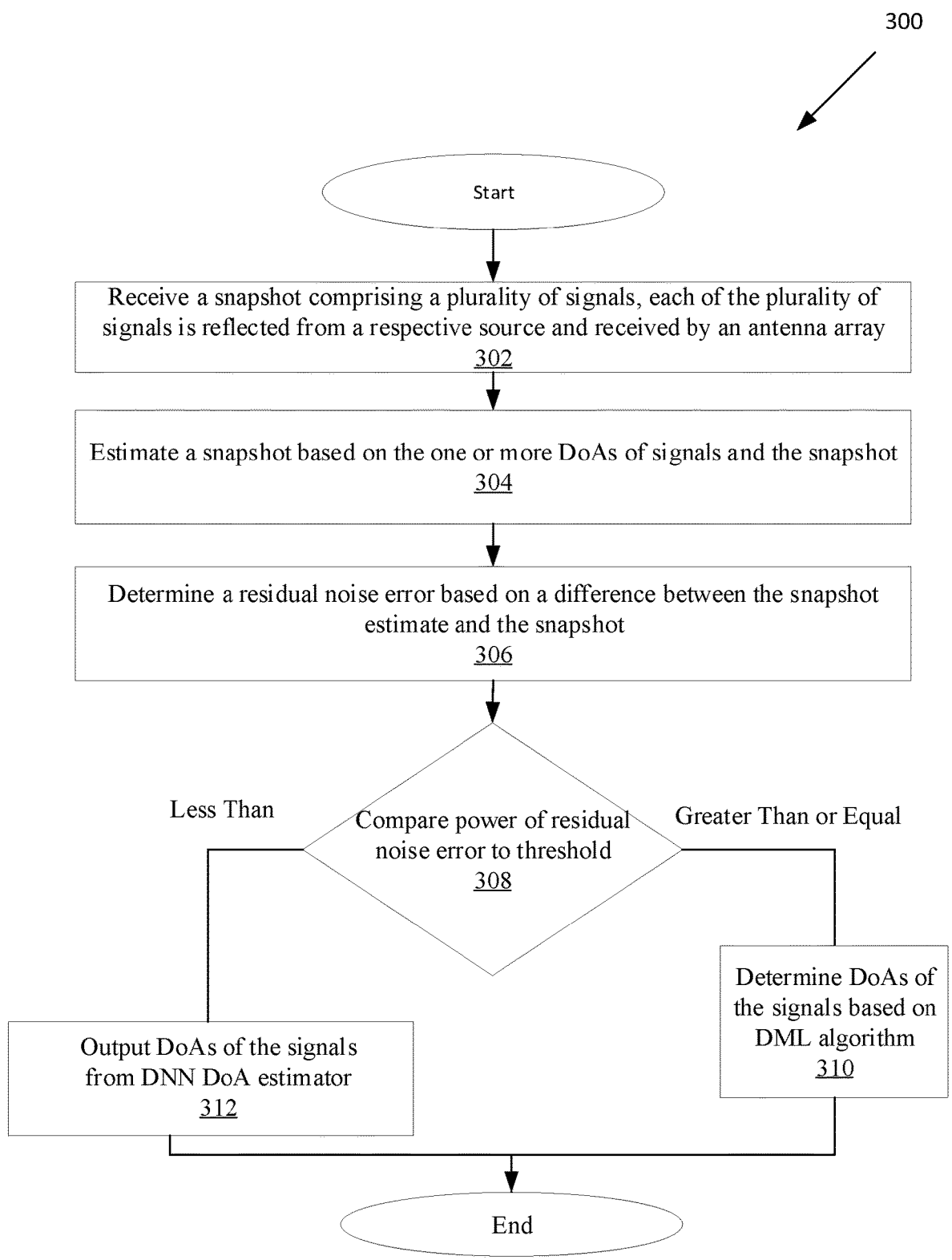
FIG. 3 is an example flow chart of example functions associated with the DoA verifier of FIG. 2. in accordance with one or more embodiments.

FIG. 3 is an example flow chart 300 of functions associated with the DoA verifier 108 in FIGS. 1 and 2. At 302, a snapshot comprising a plurality of signals is received where each of the plurality of signals is reflected from a respective source and received by an antenna array. In an example, the DNN DoA estimator receives as an input the snapshot and outputs the one or more DoAs of signals reflected by sources associated with the snapshot. For example, each DoA may correspond to a signal reflected from a respective source. The DNN DoA estimator 106 may have a low complexity but also low accuracy in estimating the DoAs of signals. At 304, the DoA verifier 108 estimates the snapshot based on the one or more DoAs of signals and the snapshot. A DML based computation is performed based on the equations above to determine the snapshot estimate. At 306, a residual noise error is determined based on a difference between the snapshot estimate and the snapshot. In the event a power of the residual noise error is less than a threshold indicative of power of a noise estimate at 308, the DoAs of signals are verified and output by the DoA verifier 108 at 312. In some examples, the threshold may be indicative of power of a noise estimate plus a noise margin. In the event the power of the residual noise error is not less than the threshold at 308, the DoAs of signals are not verified. At 310, a DML DoA estimator 116 performs a DML algorithm to determine the DoAs of signals instead of using the DoAs of signals output by the DNN DoA estimator 106. At 312, the DoA verifier 108 outputs the DoAs of signals provided by the DML DoA estimator 116.

The DML based computation performed by the DoA verifier 108 may rely on knowledge of the noise estimate and a beamforming matrix A that models antenna phase and amplitude imperfections. Further, the DNN DoA estimator 106 may associate a DoA of a signal reflected by a source with a likelihood measure and select DoAs of signals of signals reflected by respective sources based on the likelihood measure which are then output to the DoA verifier 108. The likelihood measure provides a measure of confidence of the DoAs of signals being correct but does not necessarily indicate whether a DoA corresponds to a signal reflected by a source.

Figure 4:
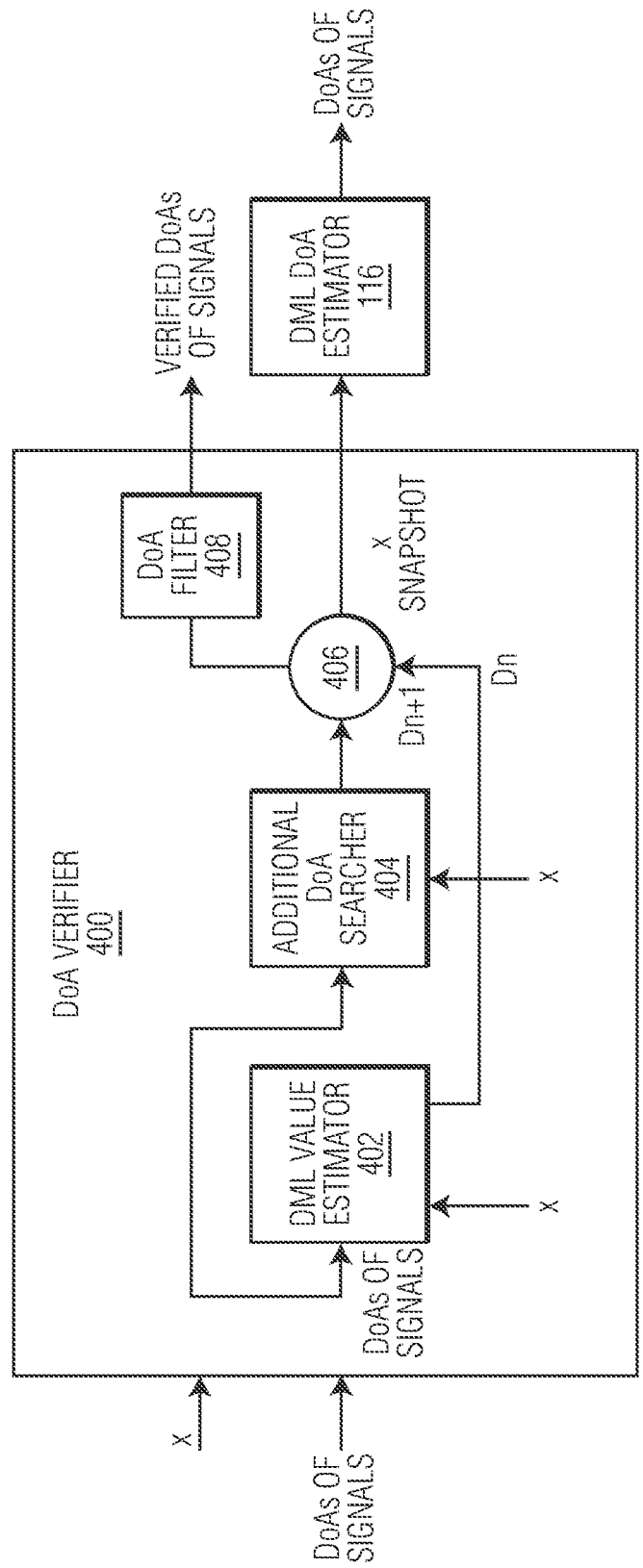
FIG. 4 is an example block diagram of an alternative example DoA verifier of the example DoA verification system in accordance with one or more embodiments.

FIG. 4 is an example block diagram of an alternative example DoA verifier 400 of the example DoA verification system in accordance with one or more embodiments. The example DoA verifier 400 may include a DML estimator 402, an additional DoA searcher 404, a comparator 406, and a DoA filter 408 each implemented using circuitry such as analog circuitry, mix signal circuitry, memory circuitry, logic circuitry, processing circuitry arranged to execute code stored in a memory and when executed by the processing circuitry perform the disclosed functions, or combinations thereof.

In an example, the DML estimator 402 may receive the DoAs of signals and the snapshot x. The DoAs of signals may be received from the DNN DoA estimator 106 and the snapshot x is generated based on the signals received by the antenna array 104. Based on the equations above and the DoAs of signals, the DML estimator 402 may determine a snapshot estimate $\tilde{x}$ and a DML value $D_n$ based on the snapshot estimate. The DML value D is calculated by the following equation where H is a conjugate transpose of the snapshot estimate.

$$D = \tilde{x}^H \cdot \tilde{x} \quad (6)$$

The DoAs of signals may also be provided to the additional DoA searcher 404. The additional DoA searcher 404 may assume that the DoAs of signals input to the DoA verifier 400 are correct for n sources. The additional DoA searcher 404 may form a beamforming matrix $A_{n+1}$ which is based on the DoAs of signals input to the DoA verifier 400 and a DoA of a signal reflected from an additional source not represented by the DoAs of signals input to the DoA verifier 400. The additional DoA searcher 404 may then compute a snapshot estimate based on the snapshot, the DoAs of signals input to the DoA verifier 400 and the DoA of the signal reflected from the additional source. In an example, values of the DoA of the signal from the additional source may be adjusted for a range from a minimum angle to a maximum angle and a respective DML value calculated for each angle using a respective beamforming matrix $A_{n+1}$.

The additional DoA searcher 404 may identify the DoA of the signal reflected from the additional source which results in a maximum DML value for the DoAs of signals input to the DoA verifier 400 and the DoA of the signal reflected from the additional source. In an example, the maximum DML value which is found might not be a global maximum of the DML values because the additional DoAs searcher 404 may identify an increase in the DML value with an additional search by varying an angle of the DoA of the signal reflected from the additional source but not changing the DoAs of signals input to the DoA verifier 400. For the global maximum of DML values one or more of the DoAs of signals input to the DoA verifier 400 might change rather than assuming the DoAs of signals input to the DoA verifier 400 is correct and determining the DML value by searching for the DoA of the signal reflected from the additional source. The correct DoAs of signals may correspond to the global maximum DML value which the additional search does not guarantee.

The highest DML value may be identified from the additional DoAs searcher 404 and represented by $D_{n+1}$. The DML value of the DoAs of signals may be identified by the DML estimator 402 and represented by $D_n$. The DML comparator 406 may then compare DML values $D_n$ with the DML values $D_{n+1}$. In an example, the comparison may be based on a ratio. The ratio may be a measure of reliability of the DoAs of signals received by the DoA verifier 400.

$$\frac{D_{\{n+1\}}}{D_{\{n\}}}$$

In the event the ratio of is close to 1, the additional DoA of the signal corresponding to the maximum DML value search is not associated with an additional source but rather with one of the sources which correspond to the DoAs of signals input to the DoA verifier 400. The DML comparator 406 outputs the DoAs of signals input to the DoA verifier 400. For example, the DML value might not increase in the event the same DoAs of signals are used twice to determine the beam steering matrix $A_{n+1}$ during the search. The DML values may be monotonic such that the following equations hold:

$$DML(\varphi_1, \ldots, \varphi_n, \varphi_{n+1}, \ldots, \varphi_{n+m}) = DML(\varphi_1, \ldots, \varphi_n) + \delta, \delta \geq 0 \text{ but small} \quad (6)$$

$$DML(\varphi_1, \ldots, \varphi_n, \varphi_n) = DML(\varphi_1, \ldots, \varphi_n) \quad (7)$$

where a DoA of a signal represented as $\varphi_i$ and i corresponds to a source i of n sources, DoAs of signals from n sources are represented by $\varphi_1, \ldots, \varphi_n$ and $\varphi_{n+1}, \ldots, \varphi_{n+m}$ are additional DoAs of signals reflected from the n sources. In view of equations (6) and (7), searching for an additional source does not affect the DML value in the event $\varphi_1, \ldots, \varphi_n$ correspond to the n sources. Further, the ratio $$\frac{D_{n+1}}{D_n}$$

in the presence of n sources might not very sensitive to changes in SNR and antenna imperfections because the values of $D_{n+1}$ and $D_n$ are both equally affected by changes in SNR and antenna imperfections.

In the event the ratio of $$\frac{D_{\{n+1\}}}{D_{\{n\}}}$$

is not close to 1, the DoA of the signal corresponding to the maximum DML value search is associated with an additional source. In an example, the DML value $D_{\{n+1\}}$ increases significantly because the DoAs of signals in $\varphi_1, \ldots, \varphi_n$ which was assumed to correspond to all sources is incorrect because a number of sources is m>n. The DoA verifier 400 may then cause a DML DoA estimator 116 to determine the DoAs of signals which include the additional source based on the DML algorithm.

In an example, in the event a DoA of a signal from the additional source is added to the list $\varphi_1, \ldots, \varphi_n$ the power of that source will be included in the DML value and increase the DML value. From this, a significantly increased DML value after searching implies that there are likely m>n sources.

$$DML(\varphi_1, \ldots, \varphi_{n+1}) > DML(\varphi_1, \ldots, \varphi_n) \quad (8)$$

In other words, the list $\varphi_1, \ldots, \varphi_n$ of candidate DoAs of signals is not complete.

A histogram of the ratio based on a snapshot with two sources and a histogram of the ratio based on a snapshot with three sources may be plotted to confirm that comparing the ratio with a threshold indicates whether the environment has two sources or three sources. The ratios may be calculated for different noise realizations applied to the signals corresponding to the two sources and a value of the ratio compared to the threshold. In the event the ratio $$\frac{D_{m+1}}{D_m} i$$

is less than a threshold for the different noise realizations, the snapshot defines signals from two sources. In the event the ratio $$\frac{D_{m+1}}{D_m}$$

is not less than the threshold for the different noise realizations, then the snapshot defines signals from three sources.

Figure 5:
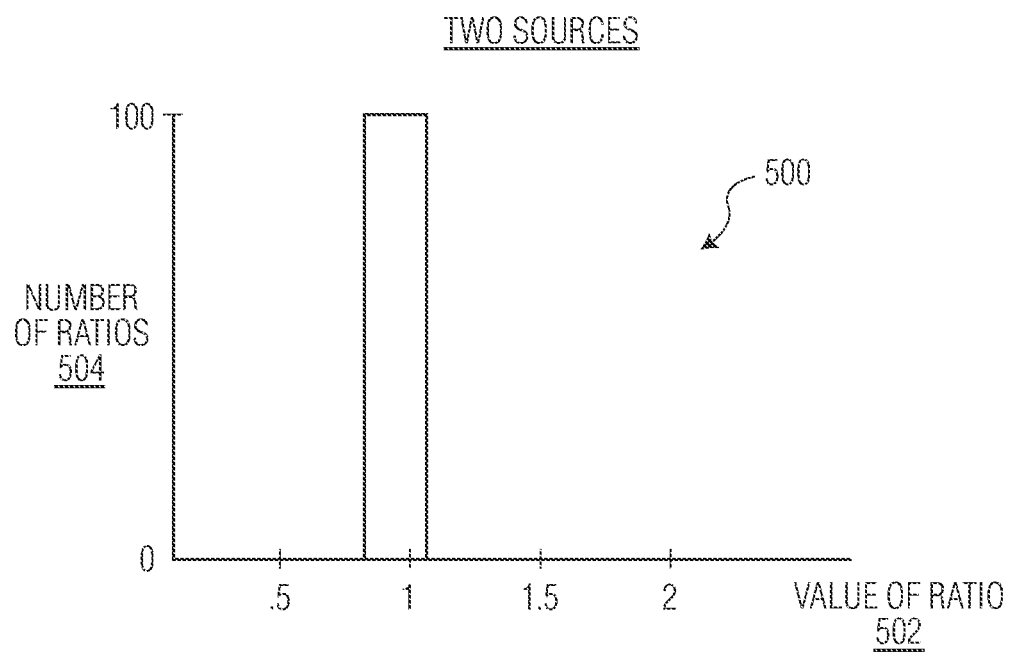
FIG. 5 is an example histogram of an example ratio generated by the alternative example DoA verifier for a snapshot with two sources in accordance with one or more embodiments.

FIG. 5 is an example of a distribution 500 of the ratio with two sources in accordance with one or more embodiments. One of the two sources may have a small power such as 10 dB SNR. The DML( ) may represent a function of determining the DML value for the DoAs of signals input to the function. DML($\phi_1, \phi_2, \phi_3$) may indicate determining a DML value for the three DoAs while DML($\phi_1, \phi_2$) may indicate determining a DML value for the two DoAs. The ratio $$\frac{DML(\phi_1, \phi_2, \phi_3)}{DML(\phi_1, \phi_2)}$$

may be determined for different noise realizations and the distribution 500 may indicate a number of ratios along axis 504 and a value of the ratio along axis 502 with the different noise realizations.

Figure 6:
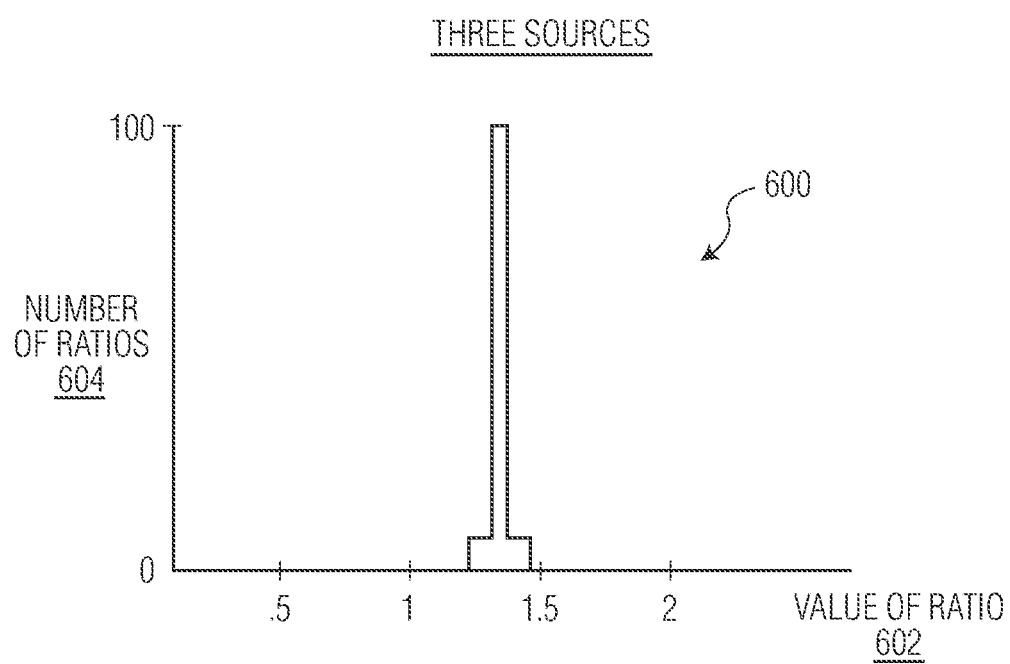
FIG. 6 is another example histogram of an example ratio generated by the alternative example DoA verifier for a snapshot with three sources in accordance with one or more embodiments.

FIG. 6 is an example of a distribution 600 of the ratio with three sources in accordance with one or more embodiments. The third source added may also have a small power such as 10 dB SNR. The ratio $$\frac{DML(\phi_1, \phi_2, \phi_3)}{DML(\phi_1, \phi_2)}$$

may be determined for different noise realizations and the distribution 600 may indicate a number of ratios along axis 604 and a value of the ratio along axis 602 for different noise realizations. The distribution 600 compared to the distribution 500 may shift with the change in number of sources. Based on the distributions 500 and 600, a threshold ratio such as 1.2 may be used to identify whether a third source is present or not. The distribution of two sources has a value of the ratio less than this amount and the distribution of three sources has a value of the ratio greater than this amount. More specifically, in the event the ratio $$\frac{DML(\phi_1, \phi_2, \phi_3)}{DML(\phi_1, \phi_2)}$$

is greater than the threshold, then three sources are present, otherwise, two sources are present. In examples, the threshold might not vary for changes in power of the sources.

The monotonic property, that likely but not necessarily holds, may be also used to detect that k<=n sources are present. Given that $\varphi_1, \ldots, \varphi_n$ are correct DoAs of signals, replacing angle $\varphi_n$ in the list $\varphi_1, \ldots, \varphi_n$, by $\varphi_{n-1}$ results in:

$$DML(\varphi_1, \ldots, \varphi_{n-1}, \varphi_{n-1}) < DML(\varphi_1, \ldots, \varphi_n) \quad (9)$$

The monotonicity properties in Eq. 8 and Eq. 9 can be applied as follows. By first performing an additional search over all angles we can exclude the case that there are m>n sources in case the DML value does not increase. In the event the DML value does not decrease by replacing a DoA $\varphi_y$, which was assumed to be correct, by another one, this $\varphi_y$ is not correct and can be removed from the list of potentially correct DoAs. From this we can conclude that k<=n sources are present.

In an example and referring back to FIG. 4, the DoA verifier 400 may perform a filtering process. The DoA verifier 400 may have a DoA filter 408 to verify whether a DoA of a signal is not reflected by a source. A ratio $$\frac{D_{n+1}}{D_n}$$

may be compared against a threshold. The ratio may be a measure of reliability of the DoAs of signals. In this equation, $D_{n+1}$ is the DML value with all the DoAs of signals output by the DML comparator 306 and $D_n$ is the DML value with one DoA of a signal excluded. The DoAs of signals associated with $D_n$ may be a subset of the DoAs of signals associated with $D_{n+1}$. In one example, a first DoA of a signal is excluded. In the event the ratio $$\frac{D_{n+1}}{D_n}$$

is not close to one for the DoA of the signal excluded, the DoA of the signal excluded was reflected by a corresponding source (with a significant power). In the event the ratio $$\frac{D_{n+1}}{D_n}$$

is close to one for the DoA of the signal excluded, the DoA of the signal excluded was not reflected (with a significant power) by a corresponding source. The DoAs filter 408 does not output the excluded DoA of the signal thereby filtering for only DoAs of signals if reflected by a source. This process is repeated for a second DoA of a signal and continued for the other DoAs of signals such that for three DoAs referenced by $D_{n+1}$=DoA 1, DoA 2, and DoA 3, $D_n$ may correspond to (DoA 1, DoA 2) in one iteration, (DoA 2, DoA 3) in another iteration, and (DoA 1, DoA 3) in yet another iteration.

In an example, the filtering process may be also performed on the DoAs of signals output by the DoA verifier 108 when the residual estimate is less than the noise estimate (plus an error margin). In an example, the residual error $\tilde{e}$ for the DoAs of signals in the list $\varphi_1, \ldots, \varphi_n$ may be compared against the noise power. In the event the difference is small, there are not m>n sources. In the event all DoAs of signals are in the list $\varphi_1, \ldots, \varphi_n$, the DML value is a global maximum. This is also true in the event redundant DoAs of signals are included. Further, k<=n sources may be associated with the DoAs of signals output by the DoA verifier and the DoA filter may determine k based on the filtering process described above.

In an example, a combination of n DoAs of signals from a set of m DoAs of signals (where n, m are integers and n<m) which produces a largest DML value may indicate that the DoAs of signals in the combination each were reflected by a source. To illustrate, the DNN may indicate three DoAs of signals even though only two sources may be present. To find the two DoAs of signals that correspond to reflection from the two sources, DML(DoA1, DoA2), DML(DoA1, DoA3) and DML(DoA2, DoA3) may be computed. The two DoAs of signals which correspond to the largest DML value may be also the two DoAs of signals reflected from the two sources.

In an example, a DML value may decrease in the event an angle $\varphi_k$ from the list $\varphi_1, \ldots, \varphi_n$ is removed. In the event removing the angle does not result in a (significant) decrease in the DML value, the angle $\varphi_k$ of a signal is not reflected from a source and should be removed from the list. After checking all $\varphi_k$ where k=1 ... n and excluding the ones that did not reduce the DML value significantly, the number of sources and the DoAs of signals reflected by sources are found.

Figure 7:
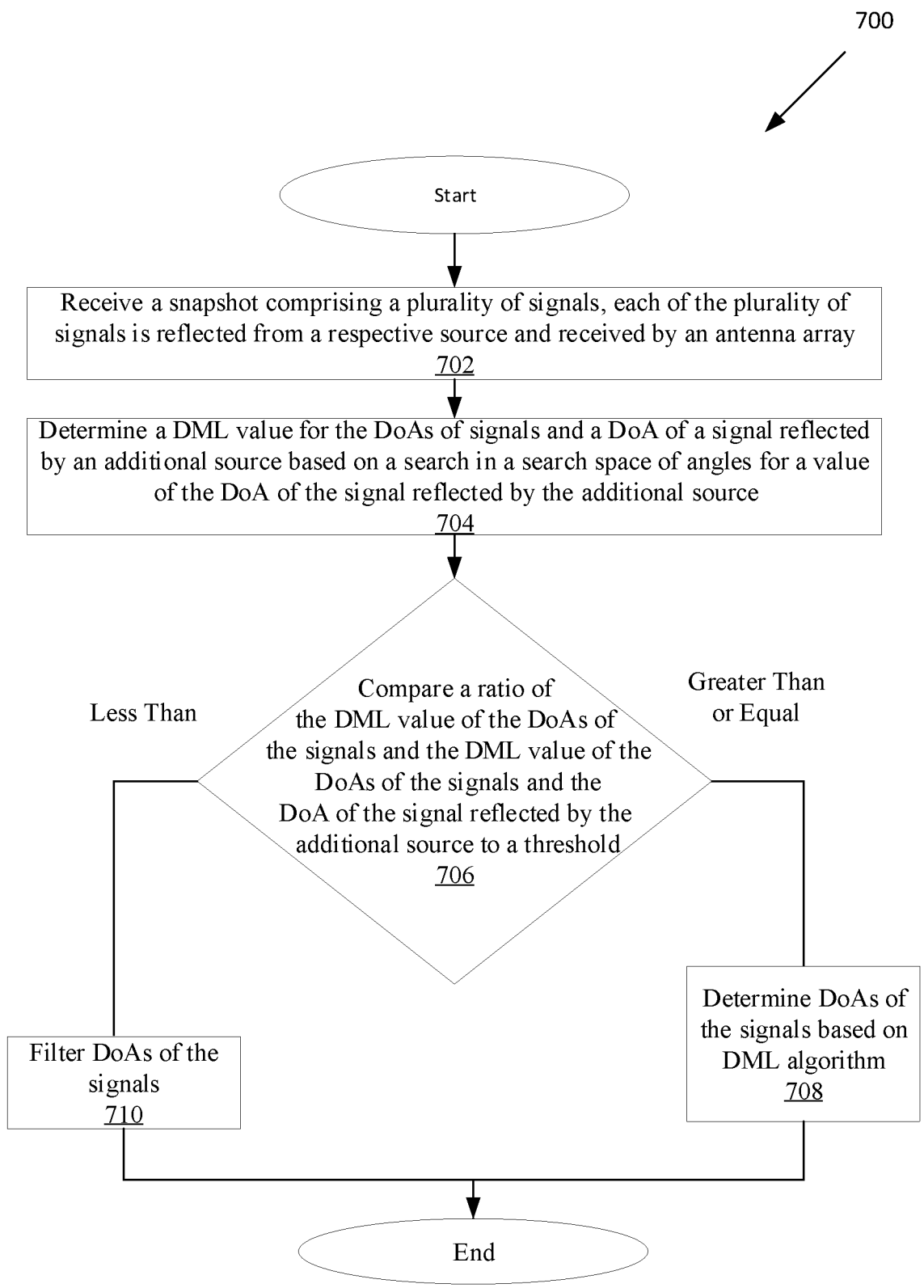
FIG. 7 is an example flow chart of example functions associated with the DoA verifier of FIG. 4 in accordance with one or more embodiments.

FIG. 7 is an example flow chart of functions 700 associated with the example DoA verifier 108 in FIG. 4 in accordance with one or more embodiments. At 702, the DoA verifier 400 receives one or more DoAs of signals from a DNN DoA estimator 106 and a snapshot of a plurality of signals, each of the plurality of signals reflected from a respective source and received by an antenna array. At 704, the DoA verifier 400 determines a DML value for the DoAs of signals provided by the DNN DoA estimator 106 and a DoA of a signal reflected by an additional source based on a search in a search space of angles for a value of the DoA of the signal reflected by the additional source. The DoA of the signal reflected from the additional source may result in the combination of the DoAs of signals provided by the DNN DoA estimator 106 and the DoA of the signal reflected by the additional source producing a maximum DML value. At 706, a ratio of (i) the DML value of the DoAs of signals provided by the DNN DoA estimator 106 and (ii) the DML value of the combination of DoAs of signals provided by the DNN DoA estimator 106 and the DoA of the signal reflected by the additional source is compared with a threshold. In the event the ratio is not less than a threshold, the DoAs of signals provided by the DNN DoA estimator 106 is not likely correct and the set of DoAs of signals should include the DoA of the signal reflected by the additional source. At 708, a DML DoA estimator is used to determine the DoAs of signals. In the event the ratio is less than a threshold, DoAs of signals received at 702 does not exclude a DoA of a signal reflected by an additional source. At 710, the DoAs of signals provided by the DNN DoA estimator 106 are filtered to determine whether they each correspond to a respective source. The filtering process comprises comparing the DML value based on the DoAs of signals provided by the DNN DoA estimator 106 and the DML value with one DoA of a signal excluded. In the event the ratio $$\frac{D_{n+1}}{D_n}$$

is close to one, the excluded DoA of a signal is likely a "phantom" DoA of a signal which was not reflected by a source (with a significant power) and is not output by the DoA filter 408. In the event the ratio $$\frac{D_{n+1}}{D_n}$$

is not close to one, the excluded DoA of a signal was reflected by a source (with a significant power) and is output by the DoA filter 408.

DoAs estimation have been carried out using several example configurations of a deep neural networks such as a residual neural network (ResNet). One execution of the ResNet with 12 convolutional layers, may take 2.8M (Mega) Multiply-Accumulates (MACs) independent of a number of sources. Computational complexity of the DML algorithm depends strongly on the number of DoAs that are estimated. Furthermore, highly optimized versions that reduce the computational complexity of the DML algorithm may exist. DoAs estimation using a fast optimized version of the DML algorithm for 2 sources may take approximately 1M MAC. For 3 sources DoAs estimation may increase to approximately 5.2M MACs. For 4 sources the computational requirement may exceed 8M MACs. Therefore, we conclude that using the ResNet is more computationally efficient in the event the DoAs of signals from more than 2 sources are estimated.

It should be noted that the use of a DNN such as ResNet is just an example of a neural network that delivers a good DoAs estimation performance. Other more computationally efficient neural networks for DoA estimation may be used. Furthermore, it is likely that these neural networks can make use of fixed point numbers whereas the DML algorithm relies on floating point numbers. Another option is to reduce the number of layers in the neural network which reduces its estimation performance. Even with reduced number of layers, reliability of the DoAs of signals may be detected in accordance with this disclosure so that these neural networks may continue to be used to determine the DoAs of signals.

A Matlab script is presented below that verifies whether the DoAs of signals for all sources are provided and confirms the DoAs of signals reflected by corresponding sources.

```
function [otherDoAs, trueDoAs] = mle_DoAs_filter(DoAs, Y)
% This function determines whether all DoAs of strong sources are
% provided and selects the DoAs with a corresponding source from
% the DoAs input variable
%
% The algorithm searches for an additional source that
% increases the DML value significantly.
%
% This algorithm does not require knowledge of the SNR and (antenna)
% imperfections because DML values for different number of DoAs are compared
% that are effected equally by SNR and imperfections. Furthermore the algorithm
% exploits that the DML value does not increase/change if twice the same angle
% is provided as DoAs.
%
% This algo contains hard-coded a particular antenna array and operating
% frequency
%
% The function takes as input the snapshot Y with the complex signals on the
```

```
% antennas in the virtual array. The other input are the DoAs that need to be
% verified. At most 3 DoAs will be verified.
    trueDoAs = [ ];
    otherDoAs = true;
    threshold = 1.1;
    c0 = 3e8;
    fc = 76e9;
    lambda = c0/fc;
    d = lambda/2;
    singlearray = [0:146];
    dTx = 13;
    arrayconfig = [singlearray singlearray+dTx];
    DMLsources=dml_value(DoAs, Y);
    N = 256;
    phirange = asin(-1:2/N:1-2/N)*180/pi;
    DMLsourcesplus1=0;
    for idx=1:N
        D=dml_value([DoAs phirange(idx)], Y);
        if (D>DMLsourcesplus1)
            DMLsourcesplus1=D;
        end
    end
    if ((DMLsourcesplus1/DMLsources) < threshold)
        otherDoAs = false;
    else
        otherDoAs = true;
    end
    if (length(DoAs)>3)
        fprintf('Error in mleDoAsfilter: providing more than 3 DoAs is not supported \n')
    end
    %filter DoAs without a corresponding source
    if (length(DoAs)==3)
        DML3D=DMLsources;
        [DML2D,idx2D]=max([ dml_value([DoAs(1) DoAs(2)], Y) dml_value([DoAs(1) .
            DoAs(3)], Y) dml value([DoAs(2) DoAs(3)], ...
                Y)]);
        [DML1D,idx1D]=max([dml_value([DoAs(1)], Y) dml_value([DoAs(2)], ...
                Y) dml_value([DoAs(3)], Y)]);
        if ((DML3D/DML2D)>threshold)
            trueDoAs = DoAs;
        elseif((DML2D/DML1D)>threshold)
            if (idx2D==1)
                trueDoAs = [DoAs(1) DoAs(2)];
            elseif (idx2D==2)
                trueDoAs = [DoAs(1) DoAs(3)];
            else
                trueDoAs = [DoAs(2) DoAs(3)];
            end
        else
            DoAs = DoAs(idx1D)
            DML0D = dml_value(DoAs+5,Y);
            if (DML1D/DML0D>threshold)
                trueDoAs = DoAs;
            end
        end
    end
    if (length(DoAs)==2)
        DML2D=dml_value([DoAs(1) DoAs(2)], Y);
        [DML1D,idx1D]=max([dml_value([DoAs(1)], Y) dml_value([DoAs(2)], Y)]);
        if (DML2D/DML1D>threshold)
            trueDoAs = DoAs;
        else
            DoAs = DoAs(idx1D);
            DML0D = dml_value(DoAs+5,Y);
            if (DML1D/DML0D>threshold)
                trueDoAs = DoAs;
            end
        end
    end
    if (length(DoAs)==1)
        DML1D = dml_value(DoAs,Y);
        DML0D = dml_value(DoAs+5,Y); %DML of other angle than DoAs(1)
        if (DML1D/DML0D>threshold)
            trueDoAs = DoAs;
        end
    end
end
```

As described above, a snapshot may comprises one or more signals reflected from one or more sources with a same range and velocity (doppler) and received by an antenna array of the radar system. A snapshot is typically an actual measurement by a radar system compared to a snapshot estimate or estimated snapshot which is an estimate of the snapshot based on the one or more received signals. Further, the phrase "DoA of a signal" may refer to a DoA of a signal reflected by a source and similarly the phrase "DoA of signals" may refer to a DoA of a signal reflected by a source, where each of the signals is reflected from a respective source.

In one embodiment, a method performed by a radar system is disclosed. The method comprises: receiving a snapshot comprising a plurality of signals, each of the plurality of signals reflected from a respective source and received by an antenna array; determining, by a first DoA estimator and based on the received snapshot, a plurality of DoAs, the plurality of DoAs comprising a respective DoA for each of the plurality of signals; measuring a reliability of the plurality of DoAs; in response to the reliability of the plurality of the DoAs exceeding a threshold, outputting at least one of the plurality of the DoAs determined by the first DoA estimator; and in response to the reliability of the plurality of the DoAs not exceeding the threshold, determining by a second DoA estimator based on the received snapshot, a second plurality of DoAs comprising a respective DoA of each of the plurality of signals and outputting at least one of the second plurality of DoAs. In an embodiment, measuring the reliability comprises determining a snapshot estimate based on a beamforming matrix which is a function of the plurality of DoAs. In an embodiment, measuring the reliability comprises determining a residual error based on a snapshot estimate and the received snapshot. In an embodiment, measuring the reliability is based on a comparison of the residual error with the threshold, wherein the threshold is based on a noise estimate. In an embodiment, measuring the reliability comprises determining a first deterministic maximum likelihood (DML) value, the first DML value being a DML value based on the plurality of DoAs. In an embodiment, measuring the reliability comprises searching in a search space for a value of a DoA of a signal reflected by an additional source, the DoA of the signal is not comprised in the plurality of the DoAs determined by the first DoA estimator. In an embodiment, measuring the reliability comprises comparing the first DML value with a further DML value being a DML value of the plurality of DoAs and the DoA of the signal reflected by the additional source. In an embodiment, the comparison comprises comparing a ratio of the first DML value with the further DML value. In an embodiment, outputting at least one of the plurality of DoAs comprises determining a subset of the plurality of DoAs which has a maximum DML value and outputting the subset. In an embodiment, the method further comprises filtering a DOA of the plurality of DoAs not associated with a respective source. In an embodiment, filtering comprises determining a ratio of the DML value of the plurality of DoAs and a DML value of a subset of the plurality of DoAs and comparing the ratio to the threshold. In an embodiment, the first DoA estimator is a deep neural network (DNN) and the second DoA estimator estimates the plurality of DoAs based on a DML estimation.

In another embodiment, a radar system is disclosed. The radar system comprise: a first DoA estimator configured to receive a snapshot comprising a plurality of signals, each of the plurality of signals reflected from a respective source and received by an antenna array; a DoA verifier configured to determine based on the received snapshot, a plurality of DoAs, the plurality of DoAs comprising a respective DoA for each of the plurality of signals; measure a reliability of the plurality of DoAs; and in response to the reliability of the plurality of the DoAs exceeding a threshold, and output at least one of the plurality of the DoAs determined by the first DoA estimator; and a second DoA estimator configured to in response to the reliability of the plurality of the DoAs not exceeding the threshold, determine by a second DoA estimator based on the received snapshot, a second plurality of DoAs comprising a respective DoA of each of the plurality of signals and output at least one of the second plurality of DoAs. In an embodiment, the DoA verifier is further configured to determine a snapshot estimate based on a beamforming matrix which is a function of the DoAs of signals determined by the first DoA estimator. In an embodiment, the DoA verifier is further configured to determine a residual error based on the snapshot estimate and the received snapshot. In an embodiment, the DoA verifier is further configured to compare the residual error with the threshold, wherein the threshold is based on a noise estimate. In an embodiment, the DoA verifier is configured to determine a first deterministic maximum likelihood (DML) value, the first DML value being a DML value based on the plurality of DoAs. In an embodiment, the DoA verifier is configured to search in a search space for a value of a DoA of a signal reflected by an additional source, the DoA of the signal is not comprised in the plurality of the DoAs determined by the first DoA estimator. In an embodiment, the DoA verifier is configured to compare the first DML value with a further DML value being a DML value of the plurality of DoAs and the DoA of the signal reflected by an additional source. In an embodiment, the comparison comprises comparing a ratio of the first DML value with the further DML value.

A few implementations have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof: including potentially a program operable to cause one or more data processing apparatus such as a processor to perform the operations described (such as program code encoded in a non-transitory computer-readable medium, which can be a memory device, a storage device, a machine-readable storage substrate, or other physical, machine readable medium, or a combination of one or more of them).

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Other implementations fall within the scope of the following claims.

What is claimed is:

1. A method performed by a radar system, the method comprising:
    receiving a snapshot comprising a plurality of signals, each of the plurality of signals reflected from a respective source and received by an antenna array;
    determining, by a first DoA estimator and based on the received snapshot, a plurality of DoAs, the plurality of DoAs comprising a respective DoA for each of the plurality of signals;
    measuring a reliability of the plurality of DoAs from the first DoA estimator, the reliability being a difference between the received snapshot and a snapshot estimate, the snapshot estimate being an estimate of signal amplitudes of the received snapshot and determined based on the plurality of DoAs;
    in response to the reliability of the plurality of the DoAs exceeding a threshold, outputting at least one of the plurality of the DoAs determined by the first DoA estimator; and
    in response to the reliability of the plurality of the DoAs not exceeding the threshold, determining by a second DoA estimator based on the received snapshot, a second plurality of DoAs comprising a respective DoA of each of the plurality of signals and outputting at least one of the second plurality of DoAs determined by the second DoA estimator,
    wherein the first DoA estimator is a deep neural network (DNN) to estimate the plurality of DoAs from the received snapshot and the second DoA estimator estimates the second plurality of DoAs from the received snapshot based on a deterministic maximum likelihood (DML) estimation and not based on the plurality of DoAs from the first DoA estimator, the DML estimation being performed after the DNN estimation when the reliability of the plurality of the DoAs determined by the DNN estimation does not exceed the threshold.

2. The method of claim 1, wherein the snapshot estimate is determined based on the received snapshot and a product of a beamforming matrix and pseudo inverse of the beamforming matrix, the beamforming matrix being a function of the plurality of DoAs, the received snapshot defining received signal amplitudes.

3. The method of claim 2, wherein measuring the reliability comprises determining a residual error based on a snapshot estimate and the received snapshot.

4. The method of claim 3,
    wherein measuring the reliability is based on a comparison of the residual error with the threshold, wherein the threshold is based on a noise estimate.

5. The method of claim 1, further comprising determining a first deterministic maximum likelihood (DML) value, the first DML value being a DML value based on the plurality of DoAs.

6. The method of claim 5, further comprising searching in a search space for a value of a DoA of a signal reflected by an additional source, the DoA of the signal is not comprised in the plurality of the DoAs determined by the first DoA estimator.

7. The method of claim 6, further comprising
    comparing the first DML value with a further DML value based on the second plurality of DoAs and the DoA of the signal reflected by the additional source to determine a number of sources, wherein the further DML value always monotonically increases from the DML value when the second plurality of DoAs and the DoA ef reflected by the additional source are valid.

8. The method of claim 7, wherein the comparison comprises comparing a ratio of the first DML value with the further DML value.

9. The method of claim 1, wherein outputting at least one of the plurality of DoAs comprises determining a subset of the plurality of DoAs which has a maximum DML value and outputting the subset.

10. The method of claim 1, further comprising filtering a DOA of the plurality of DoAs not associated with a respective source.

11. The method of claim 10, wherein filtering comprises determining a ratio of the DML value of the plurality of DoAs and a DML value of a subset of the plurality of DoAs and comparing the ratio to the threshold.

12. A radar system comprising:
    a first DoA estimator configured to receive a snapshot comprising a plurality of signals, each of the plurality of signals reflected from a respective source and received by an antenna array;
    a DoA verifier configured to determine based on the received snapshot, a plurality of DoAs, the plurality of DoAs comprising a respective DoA for each of the plurality of signals; measure a reliability of the plurality of DoAs, the reliability being a difference between the received snapshot and a snapshot estimate, a snapshot estimate determined based on the plurality of DoAs and being an estimate of signal amplitudes of the received snapshot; and in response to the reliability of the plurality of the DoAs exceeding a threshold, and output at least one of the plurality of the DoAs determined by the first DoA estimator; and
    a second DoA estimator configured to in response to the reliability of the plurality of the DoAs not exceeding the threshold, determine by a second DoA estimator based on the received snapshot, a second plurality of DoAs comprising a respective DoA of each of the plurality of signals and output at least one of the second plurality of DoAs determined by the second DoA estimator,
    wherein the first DoA estimator is a deep neural network (DNN) to estimate the plurality of DoAs from the received snapshot and the second DoA estimator estimates the second plurality of DoAs from the received snapshot based on a deterministic maximum likelihood (DML) estimation and not based on the plurality of DoAs from the first DoA estimator, the DML estimation being performed after the DNN estimation when the reliability of the plurality of the DoAs determined by the DNN estimation does not exceed the threshold.

13. The radar system of claim 12, wherein the snapshot estimate is based on the received snapshot and a beamforming matrix which is a function of the DoAs of signals determined by the first DoA estimator.

14. The radar system of claim 12, wherein the DoA verifier is further configured to determine a residual error based on the snapshot estimate and the received snapshot.

15. The radar system of claim 14, wherein the DoA verifier is further configured to compare the residual error with the threshold, wherein the threshold is based on a noise estimate.

16. The radar system of claim 12, wherein a second DoA verifier is configured to determine a first deterministic maximum likelihood (DML) value, the first DML value being a DML value based on the plurality of DoAs.

17. The radar system of claim 12, wherein the second DoA verifier is configured to search in a search space for a value of a DoA of a signal reflected by an additional source, the DoA of the signal is not comprised in the plurality of the DoAs determined by the first DoA estimator.

18. The radar system of claim 17, wherein second the DoA verifier is configured to compare a first deterministic maximum likelihood (DML) value with a further DML value based on the second plurality of DoAs and the DoA of the signal reflected by an additional source to determine a number of sources, wherein the further DML value always monotonically increases from the DML value when the second plurality of DoAs and the DoA reflected by the additional source are valid, and wherein the first DML value is a DML value based on the plurality of DoAs.

19. The radar system of claim 18, wherein the comparison comprises comparing a ratio of the first DML value with the further DML value.

* * * * *